(No Model.)
H. C. NICHOLSON.
Sextuplex Telegraph.
No. 242,356.        Patented May 31, 1881.
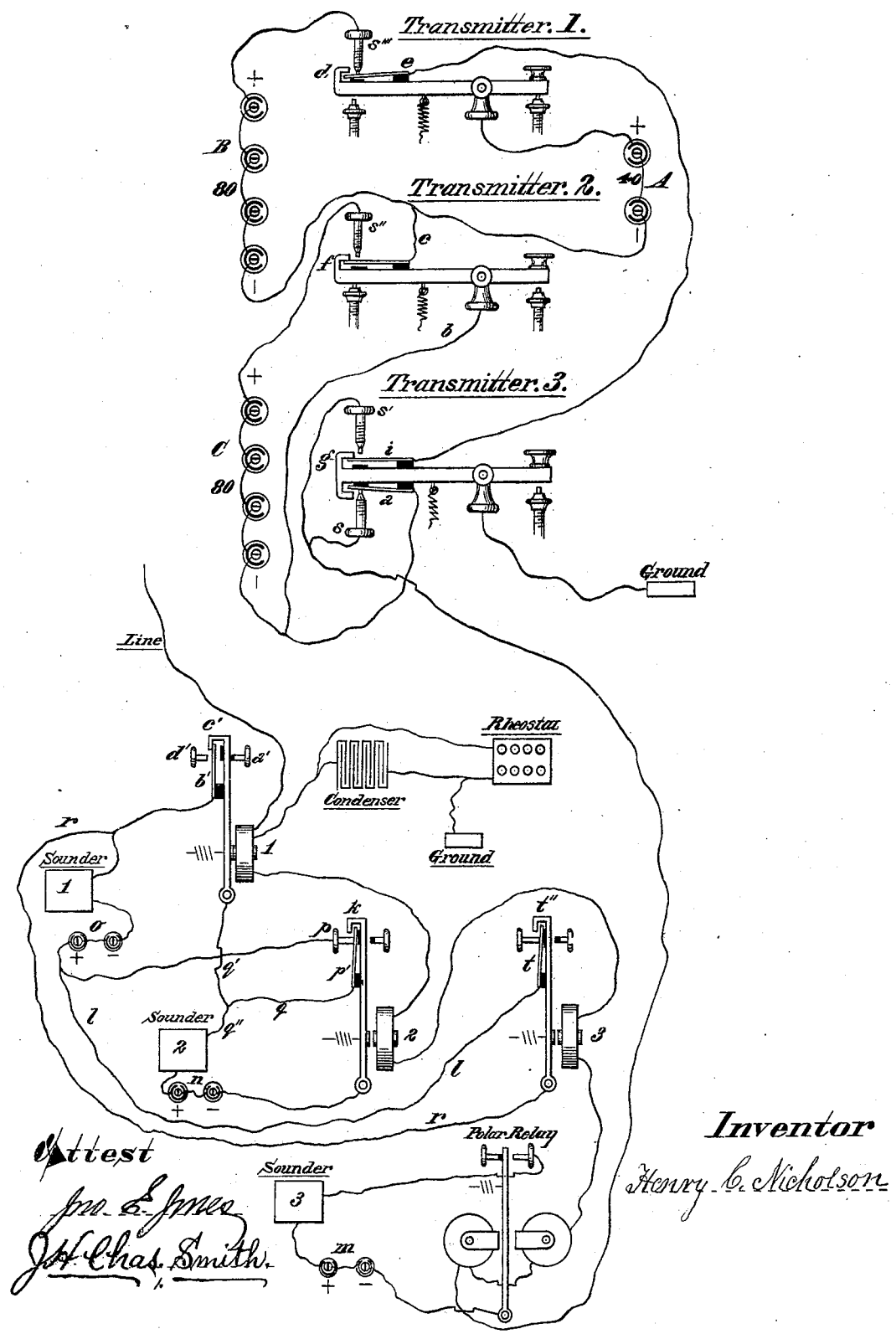

UNITED STATES PATENT OFFICE.

HENRY C. NICHOLSON, OF KENTON, KENTUCKY.

SEXTUPLEX TELEGRAPH.

SPECIFICATION forming part of Letters Patent No. 242,356, dated May 31, 1881.

Application filed January 25, 1881. (No model.)

*To all whom it may concern:*

Be it known that I, HENRY C. NICHOLSON, a citizen of the United States, of Kenton, in the county of Kenton and State of Kentucky, have invented certain new and useful Improvements in Multiplex Telegraphy, of which the following is a specification.

This invention relates to an electric telegraph adapted for the simultaneous transmission of three separate and distinct messages, making use, to that end, of currents differing in polarity and in intensity.

My improvement consists in so combining three sections of battery with two single-current transmitters or keys and one double-current or pole-changing transmitter or key that at no time more than two sections of battery shall be in circuit.

It further consists of the combination of three neutral relays, (separately constructed, like the neutral relay described and claimed in my application for Letters Patent filed January 10, 1881,) whereby these relays may properly operate two sounders in response to the operation of the single-current transmitters or keys, and also obviate interference with the operation of these sounders in consequence of reversals of the flow of the currents by the double-current transmitter or key.

In order that my invention may be clearly understood I have illustrated in the annexed drawing, and will proceed to describe, the best form thereof at present known to me. I would state at the outset that the transmitting apparatus does not depend upon the special receiving apparatus illustrated, but may be used in connection with other suitable receiving apparatus.

The drawing represents three keys. Two of them are commonly known as "single" transmitters," and one of them a "reversing" or "pole-changing" key. Transmitter No. 1 has the independent control of two batteries, A and B. Battery B has twofold greater strength than battery A. The lesser battery is in circuit when key 1 is open, and if key 1 is closed the lesser battery A will be cut out of circuit thereby, and the larger battery B will be inserted, each presenting similar polarity, as shown in the drawing. The function of key 1 is to substitute a larger for a smaller strength of battery, and vice versa, thus controlling relay 1 at the distant station. Said relay 1 is adjusted by its retractile spring to respond to battery B, and not respond to the lesser battery A.

The batteries A and B are marked "forty" for the lesser battery strength and "eighty" cells for the greater. This is to represent a sufficient margin for the proper adjustment between the common or neutral relays at the distant station.

If the single transmitters 1 and 2 are open, then forty cells of battery will be in circuit, subject to the control of the reverser-key 3. The route from line to ground will be via relays 1, 2, and 3 and the polar relay, and thence to the front and back stops or contact-points of transmitter 3, $s$, and spring $a$, thence to transmitter 2, via $b$ to hook $f$, spring $c$ to battery A, hook $d$, spring $e$, thence to spring $i$, hook $g$, to ground. The battery will be forty cells with minus to line. If the reverser-key—key 3—be closed or depressed the route of battery A will be transposed from earth to line, and the opposite polarity will be presented—to wit, forty cells with plus to line. The first condition—minus to line—holds the tongue of the polar relay to open the local battery $m$, and thus, if the polarity be changed to the opposite—say plus—the tongue will change position and close the sounder 3. All line-currents pass through the double-current transmitter or key, and when such transmitter is open or in its normal position the negative pole of battery will be presented to line under all positions of the single-current transmitters. Hence the polar relay will respond only to the double-current transmitter, and it will so respond whatever of battery may be in circuit at the time.

The drawing represents key 1 as closed, and, consequently, battery B in circuit; with relay 1 closed on stop $a'$, with spring $b'$ in contact with hook $c'$. The circuit from local battery $o$ passes from the armature-lever of relay 1 through the top hook, $c'$, to spring $b'$ and to sounder 1. Thus when the armature-lever moves forward to stop $a'$ the sounder 1 will close and respond to transmitter 1. If the relay is open, then spring $b'$ is pressed from contact with hook $c'$ and breaks the circuit of battery

*o*. It will be seen in the drawing that the circuit of battery *o* passes to the back contact, *p*, of relay 2 and spring *p'*, and route *q q'* to armature of relay 1. The object of this arrangement is that if both relays, 1 and 2, respond to transmitter 2 sounder 2 will only respond.

It will be seen in the drawing that if transmitter 2 is depressed battery C with eighty strength will be added to the battery in circuit from key 1. If transmitter 1 is open, then eighty cells will join forty, making a total of one hundred and twenty cells. This increase will overcome the retractile spring belonging to relay 2, and also relay 1. Sounder 2 alone will respond, because that local circuit which passes through the armature-lever of relay 1 is now interrupted at the back stop, *p*, of relay 2, so that local battery *o* remains open. The route of local battery *n* is then by sounder 2 *q'' g p' k* armature-lever of relay 2. Relay 3 is adjusted above the battery strength of, say, one hundred and twenty cells, and within the scope of one hundred and sixty cells. If both keys, transmitter 1, and also transmitter 2 be closed, then the batteries B and C will be in circuit with eighty cells each, which will give a total of one hundred and sixty cells. This will cause the relays 1, 2, and 3 to respond, and sounders 1 and 2 will respond to transmitters 1 and 2, for relay 3 now closes local battery *o*, the route being *l t t'' r* sounder 1. Local battery *n* is at the same time closed as before. If transmitter 3 be operated reversal of the different strengths will always actuate the polar relay and sounder No. 3. Thus three separate and distinct messages may be transmitted on a single line-wire from one station to a distant station.

By duplexing the apparatus, either upon the differential plan, as indicated in the drawing, or upon any other known plan, and applying a transmitting and a receiving apparatus at each end of the line, six separate and distinct messages may be simultaneously transmitted, three from each end, and duly received at opposite ends.

The drawing shows the keys to be manipulated with the hand. Ordinary local magnets closed by the common Morse key should be used as preferable. The omission in the drawing was made for the purpose of simplifying the drawing. All the transmitters or keys are circuit-preserving ones.

I do not claim the broad combination, at one station, of two continuity-preserving single-current transmitters or keys and one continuity-preserving double-current transmitter or key; nor the broad combination of three transmitters at one station controlling three batteries, and four relays at the other station controlling three sounders; nor the broad combination of three relays which operate to control two sounders. These combinations I believe to be old.

What I claim is—

1. The combination, substantially as before set forth, of a single-current transmitter or key and two sections of battery differing in strength and put in circuit alternately (by substituting one for the other) in the operation of said transmitter or key.

2. The combination, substantially as before set forth, of a single-current transmitter or key, two unequal sections of battery under the independent control and put in circuit alternately (by substituting one for the other) in the operation of said transmitter or key, and a double-current transmitter or key.

3. The combination, substantially as before set forth, of a single-current transmitter or key independently controlling and adapted to alternately put in circuit the one and the other of two sections of battery differing in strength, a single-current transmitter or key controlling a section of battery stronger than the lesser battery controlled by the first-mentioned transmitter or key, and a double-current transmitter or key.

4. The combination, substantially as before set forth, of neutral relays 1, 2, and 3, differently adjusted, as described, and having armature-levers constructed with a hook and an insulated contact-spring, forming local-battery terminals, a local battery independently controlled by relay 2, and a local battery controlled by relays 1 and 2 conjunctively, and also separately by relay 3.

In testimony whereof I have hereunto set my hand in the presence of two subscribing witnesses.

HENRY C. NICHOLSON.

Witnesses:
EUGENE FIRNKOESS,
J. H. CHARLES SMITH.